(12) United States Patent
Kang et al.

(10) Patent No.: US 7,409,285 B2
(45) Date of Patent: Aug. 5, 2008

(54) HOMOGENEOUS CHARGE COMPRESSION IGNITION ENGINE OPERATION

(75) Inventors: Jun-Mo Kang, Ann Arbor, MI (US); Chen-Fang Chang, Troy, MI (US); Man-Feng Chang, Troy, MI (US); Tang-Wei Kuo, Troy, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/739,142

(22) Filed: Apr. 24, 2007

(65) Prior Publication Data

US 2007/0250256 A1 Oct. 25, 2007

Related U.S. Application Data

(60) Provisional application No. 60/794,561, filed on Apr. 24, 2006.

(51) Int. Cl.
*G06F 19/00* (2006.01)
*G06G 7/70* (2006.01)

(52) U.S. Cl. .................. 701/115; 701/103; 73/117.3

(58) Field of Classification Search .............. 701/104, 701/103, 102, 115, 108, 109; 73/117.3
See application file for complete search history.

(56) References Cited

U.S. PATENT DOCUMENTS

| | | | |
|---|---|---|---|
| 6,230,694 B1 * | 5/2001 | Cook et al. | 123/568.11 |
| 6,874,360 B1 * | 4/2005 | Kar et al. | 73/117.3 |
| 2002/0078918 A1 | 6/2002 | Ancimer et al. | |
| 2003/0066498 A1 | 4/2003 | Guy | |
| 2006/0016438 A1 | 1/2006 | Kang | |

OTHER PUBLICATIONS

P. Najt, D. Foster, "Compression-Ignition Homogeneous Charge", SAE paper 830264, Detroit, MI.
C. J. Chiang and A.G. Stefanopoulou, "Steady-State Multiplicity and Stability of Thermal Equilibria in Homogeneous Charge Compression Ignition (HCCI) Engines", IEEE Proceedings of 2004 Conference in Decision and Control, U.S.A.

* cited by examiner

*Primary Examiner*—Hieu T. Vo (57) ABSTRACT

An HCCI engine is operated by controlling a plurality of engine operating parameters in accordance with a calibration data set representing equilibrium set-points of engine operation characterized by combustion phasing that is relatively least sensitive to cylinder charge temperature deviations.

12 Claims, 7 Drawing Sheets

HOMOGENEOUS CHARGE COMPRESSION IGNITION ENGINE OPERATION

CROSS REFERENCE TO RELATED APPLICATIONS

This application claims the benefit of U.S. Provisional Application No. 60/794,561 filed on Apr. 24, 2006 which is hereby incorporated herein by reference.

TECHNICAL FIELD

This invention relates to homogeneous charge compression ignition (HCCI) engines.

BACKGROUND OF THE INVENTION

In homogeneous charge compression ignition (HCCI) engine, combustion is flameless, and spontaneously occurs at the entire cylinder volume. The homogeneously mixed cylinder charge is auto-ignited as the cylinder charge is compressed and its temperature increases. The ignition timing of auto-ignited combustion strongly depends on initial cylinder charge conditions such as temperature, pressure, and composition. Thus, it is important to coordinate the engine inputs, such as fuel mass, injection timing, and valve motion, to ensure robust HCCI combustion. Depending on the valve motion, there are two prevailing operating strategies in an HCCI engine—exhaust recompression strategy and exhaust re-breathing strategy.

In the exhaust recompression strategy, the cylinder charge temperature is controlled by trapping hot exhaust gas from the previous engine cycle by closing the exhaust valve early during the exhaust stroke, while opening the intake valve with late timing symmetrical to the exhaust valve closing timing. In this valve strategy, the cylinder charge composition and temperature depend on how early the exhaust valve closes during the exhaust stroke. For example, if the exhaust valve closes earlier during the exhaust stroke, more hot exhaust gas from the previous engine cycle would be trapped in the cylinder, leaving less cylinder volume for the fresh air mass, thereby, increasing the cylinder temperature, while decreasing the cylinder oxygen level. In the exhaust recompression strategy, the exhaust valve closing timing (thereby, the intake valve opening timing) is typically quantified by valve overlap, which has a negative number. The Negative Valve Overlap (NVO) is defined as the duration in crank angle between exhaust valve closing and intake valve opening. Thus, the initial cylinder charge conditions strongly depend on the intake and exhaust valve timings.

In contrast, in the exhaust re-breathing strategy, the cylinder charge temperature is controlled by re-inducting the hot exhaust gas into the cylinder through re-opening of the exhaust valve during the intake stroke. In this valve strategy, the cylinder charge composition and temperature depend on the lift of the exhaust valve re-opening during the intake stroke. Similarly with the exhaust recompression strategy, if the exhaust valve re-opens higher during the intake stroke, more hot exhaust gas from the previous engine cycle would be re-inducted in the cylinder, leaving less cylinder volume for the fresh air mass which, as a result, would increase the cylinder temperature, while decreasing the cylinder oxygen level. In this case, initial cylinder charge conditions strongly depend on the lift and/or duration of second opening of the exhaust valve.

Either with exhaust recompression strategy or re-breathing strategy, rapid change in inputs to the HCCI engine such as valve timing, EGR valve opening, injection timing, etc., is required to maintain sufficient thermal energy for successful auto-ignited combustions during load/speed transient. Thus, precise and fast actuator control is necessary for a successful transition between set-points, while those set-points are also required to be robust to disturbances that can be inevitably introduced during transient operation. Additionally, HCCI is sensitive to operating factors such as, for example, ambient temperature, engine coolant temperature, altitude, humidity, etc. making robust and stable control even more challenging.

SUMMARY OF THE INVENTION

The present invention provides for robust operating set-points for an HCCI engine using an engine model that describes the combustion characteristics of an HCCI engine. The model used in the present invention consists of two sub-models; a gas exchange process model (GEM) and an HCCI combustion process model (CM).

A method for operating a homogeneous charge compression ignition engine includes providing a calibration data set within a data space representing equilibrium set-points of engine operation in a plurality of engine operating parameters. These set-points are characterized by combustion phasing that is relatively least sensitive to cylinder charge temperature deviations. The engine operating parameters are controlled in accordance with said calibration data set and may include, for example, engine valve profile parameters, engine fueling parameters, and engine exhaust gas recirculation parameters. Additionally, the engine operating parameters may include engine spark parameters and intake air throttle parameters.

BRIEF DESCRIPTION OF THE DRAWINGS

Embodiments of invention may take physical form in certain parts and arrangement of parts, the preferred embodiment of which will be described in detail and illustrated in the accompanying drawings which form a part hereof, and wherein.

DESCRIPTION OF THE PREFERRED EMBODIMENT

Figure 1:
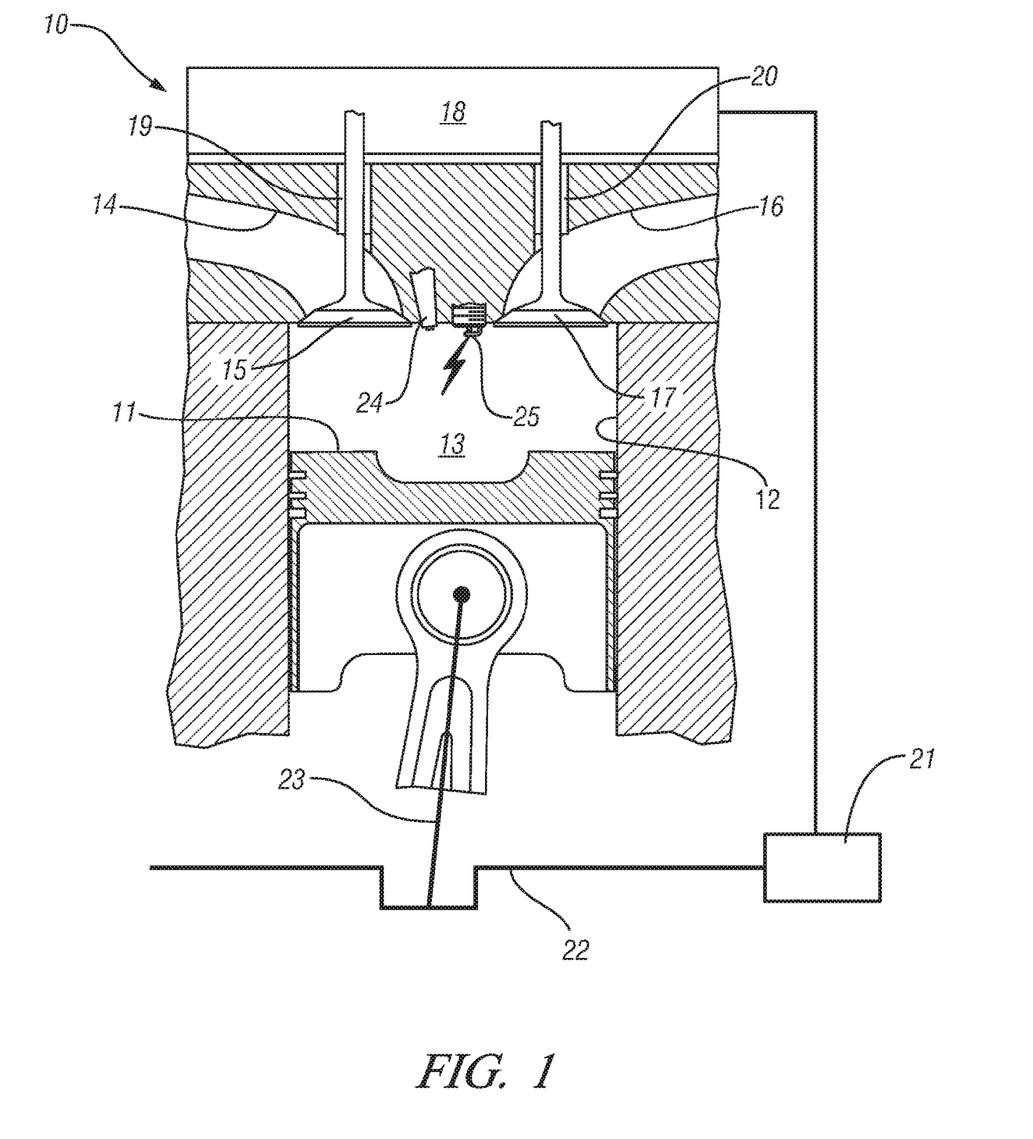
FIG. 1 is a schematic illustration of an exemplary single cylinder gasoline direct-injection four-stroke internal combustion engine capable of being operated according to the present invention.

Referring first to FIG. 1 of the drawings in detail, numeral 10 generally indicates a schematic representation of an exemplary single-cylinder direct-injection four-stroke internal combustion engine. In the figure, a piston 11 is movable in a cylinder 12 and defines with the cylinder 12 a variable volume combustion chamber 13. An intake passage 14 supplies air into the combustion chamber 13. Air flow into the combustion chamber 13 is controlled by an intake valve 15. Combusted gases can flow from the combustion chamber 13 via an exhaust passage 16, controlled by an exhaust valve 17.

Exemplary engine 10 has a hydraulically controlled valve train with an electronic controller 18, which is programmable and hydraulically controls the opening and closing of both the intake 15 and exhaust 17 valves. The electronic controller 18 will control the movement of the intake valve 15 and exhaust valve 17 having regard to the positions of the intake and exhaust valves 15 and 17 as measured by two position transducers 19 and 20. Such a hydraulically controlled valve system is generally considered fully flexible with respect to establishing desired valve profiles in lift, duration and phase. Alternative valve train mechanizations including, for example, multi-step cams and independent intake/exhaust phasers are also known for effecting the in-cylinder conditions conducive to HCCI operation. The controller 18 will also refer to the angular position of the engine, as indicated by a rotation sensor 21 connected to the engine crankshaft 22. Similarly, various other sensors may be employed in the engine controls as known to one skilled in the art, including non-exhaustive examples of engine exhaust gas temperature, exhaust gas constituents sensors, mass air flow, manifold/ambient pressure and temperature. The crankshaft 22 is connected by a connecting rod 23 to the piston 11 reciprocating in the cylinder 12. A gasoline direct injector 24, controlled by the electronic controller 18, is used to inject fuel directly into the combustion chamber 13. The various functions ascribed to the controller 18 may equally well be performed by a plurality of separate but coordinated controllers adapted for the various tasks.

A spark plug 25, controlled also by the electronic controller 18, is used to enhance the ignition timing control of the engine at certain conditions (e.g. during cold start and near the low load operation limit). Also, it has proven preferable to rely on spark ignition near the high part-load operation limit under controlled auto-ignition combustion and during high speed/load operating conditions with throttled or non-throttled SI operation.

The engine is designed to operate on fuel injected gasoline or similar blends, unthrottled with HCCI combustion over an extended range of engine speeds and loads, which may include engine starting where possible. However spark ignition and throttle controlled operation may be utilized with conventional or modified control methods under conditions not conducive to HCCI operation and to obtain maximum engine power. Applicable fueling strategies may including direct cylinder injection, port fuel injection or throttle body fuel injection. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases etc. may also be used in the implementation of the present invention.

The control system and method described herein below pertains particularly to an engine operated with HCCI combustion that may include a spark ignition backup. The combustion control system includes one or more computers or controllers adapted to carry out a repetitive series of steps or functions in a method of combustion control according to the invention.

Figure 2:
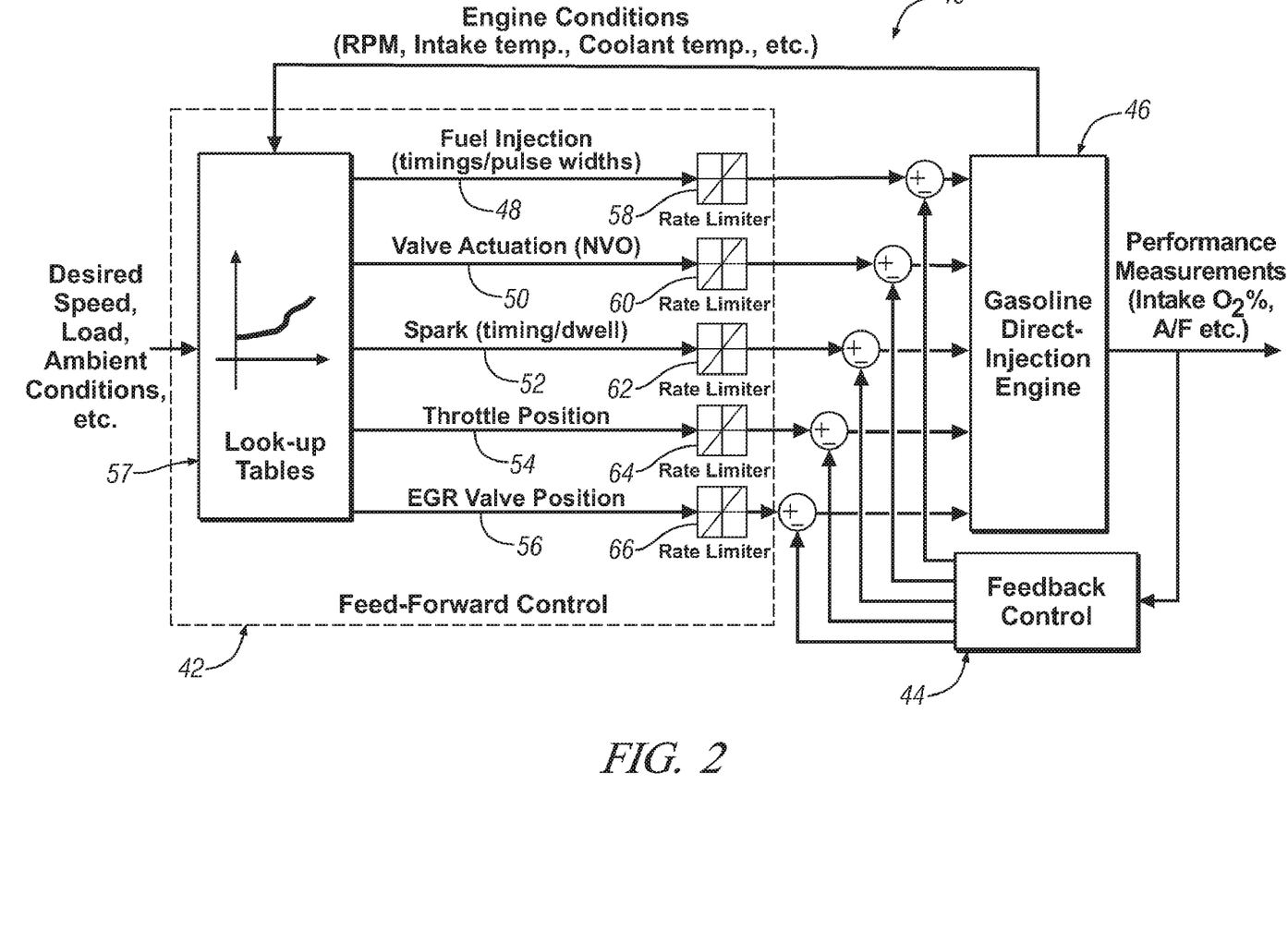
FIG. 2 is a diagrammatic view of an exemplary controller with which robust controlled auto-ignition combustion is maintained during various steady state and transient operations in accordance with the present invention.

FIG. 2 shows a schematic diagram of an engine controller 40 with which robust controlled auto-ignition combustion is achieved during steady state and transient operation. The controller 40 includes a feed forward control 42 and a feedback control 44, connected with associated components of a representative gasoline direct-injection engine 46.

The feed forward control 42 achieves a fast system response. Based on the desired load and engine operating mode conditions, required fuel injection timings (FI) and pulse widths (fueling rate) 48, valve actuation (including negative valve overlap (NVO)) 50, spark timing (SI) 52, throttle position 54, and EGR valve position 56 are calculated from look-up tables 57 to control the combustion phasing. Also, depending on the current engine operating conditions and driver's load demand, variable rate limiters 58, 60, 62, 64, 66 are used to compensate different dynamics in the system, e.g., air and fuel dynamics.

Robust controlled auto-ignition combustion is maintained during severe load transients using only the feed forward control 42 with calibrated took-up tables. Although not being emphasized here, the feedback control is used to further enhance the overall system robustness.

In general operation of the feed forward control 42 during rapid load transients with HCCI (homogenous charge compression ignition) engine operation, inputs to the engine, including at least spark timing (SI), fuel injection timing (FI) and valve timing (and, where used, throttle position and EGR valve position) are set equal to (i.e. synchronized with) steady state inputs corresponding to the current fueling rate. Pre-calibrated steady state inputs are stored in the look-up tables 57, and the engine inputs are determined by interpolating values of steady state inputs in the look-up tables.

Further details of an exemplary HCCI control is found in commonly assigned U.S. patent application Ser. No. 11/366,217, filed Mar. 2, 2006, the contents of which are hereby incorporated by reference.

The feedforward controller 42 is designed based on extensive calibrations to ensure a successful HCCI combustion under steady state operating conditions. However, with feedforward control only, the phasing of combustion can suffer from disturbances and/or environmental changes. Disturbances include, for example, significant or rapid changes in engine speed and load, which are necessary occurrences in vehicle engine operation. The present invention provides a systematic method or guide-line to effectively calibrate the set-point, and reduces reliance on feedback control for robust transient performance.

It is assumed that the HCCI engine is operating at a constant engine speed under un-throttled conditions with a constant fueling rate and a constant intake manifold temperature. In addition, the following assumptions are used to simplify modeling.

(A.1) Intake and exhaust manifold pressures are constant.

(A.2) Pressure at IVC (Intake Valve Closing) is equal to intake manifold pressure.

(A.3) EVC (Exhaust Valve Closing) and IVO (Intake Valve Opening) are fixed at symmetric timings around the intake TDC.

(A.4) Once the valve motion (from either exhaust recompression strategy or exhaust re-breathing strategy) is fixed, the partial pressures of the intake charge and the exhaust gas trapped in the cylinder by the valve motion remain constant.

(A.5) Specific heat per unit mass, Cp, Cv, and thus, $\gamma$=Cp/Cv remain constant over an entire engine cycle.

(A.6) Injected fuel mass in the cylinder completely burns, i.e., the combustion efficiency is 100%.

The gas exchange process model focuses on the cylinder charge temperature after the gas exchange process. Once the exhaust gas temperature, $T_{exh}$, and valve profiles (i.e. combinations of lift, duration and phase of intake and exhaust valves from either exhaust recompression strategy or exhaust re-breathing strategy) are given, the cylinder charge temperature at IVC ($T_{ivc}$) for the next combustion cycle can be algebraically modeled based on (A.2), (A.4), energy balance and the ideal gas law in accordance with the following relationships:

$$T_{ivc} = \frac{p_i T_{int} T_{exh}}{p_{ip} T_{exh} + p_{ep} T_{int}} \quad (1)$$

$$p_i = p_{ip} + p_{ep} \quad (2)$$

where $T_{int}$ is the intake temperature, $p_i$ is the intake manifold pressure, $p_{ip}$ is the partial pressure of the intake charge, and $p_{ep}$ is the partial pressure of the exhaust gas trapped in the cylinder.

Figure 3:
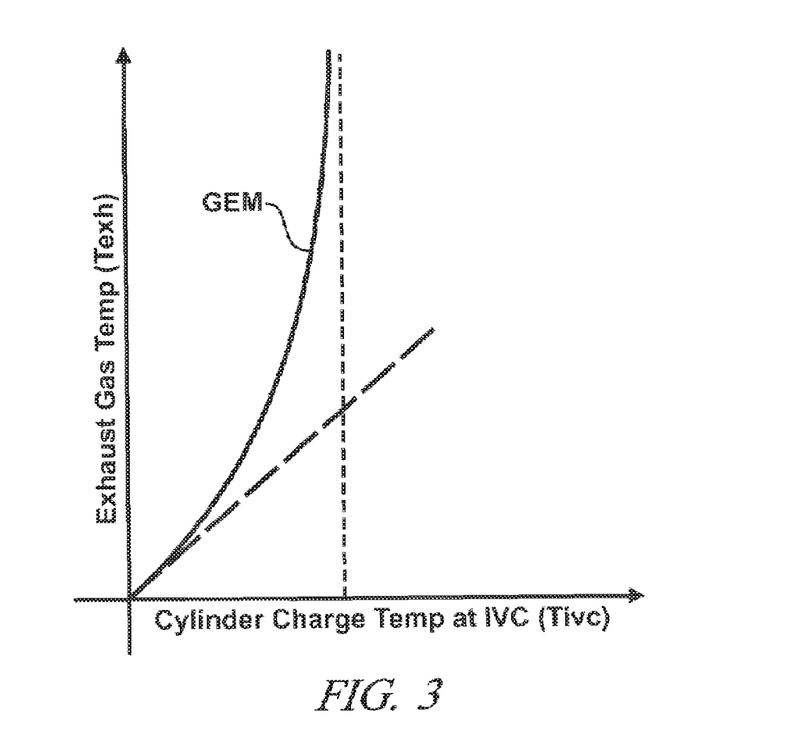
FIG. 3 is a data plot of a characteristic curve of cylinder charge temperature at intake valve closing versus exhaust gas temperature corresponding to a gas exchange model in accordance with the present invention.

It is assumed that both $p_{ep}$ and $p_{ip}$ remain constant as long as the valve motion is fixed based on (A.4). FIG. 3 shows a typical curve from the gas exchange process model that shows the relationship between exhaust gas temperature ($T_{exh}$) and cylinder charge temperature at IVC ($T_{ivc}$) at the next engine cycle given a fixed valve profile. Correlation of combustion exhaust gas temperature ($T_{exh}$) and cylinder charge temperature at IVC ($T_{ivc}$) is represented by the solid curve GEM. It should be noticed that $T_{ivc}$ monotonically increases as the exhaust gas temperature increases, and it is upper bounded in accordance with the following relationship:

$$T_{ivc} < T_{ivc}^{max} = \frac{p_i}{p_{ip}} T_{int} \quad (3)$$

The energy release from HCCI combustion strongly depends on the temperature and oxygen concentration of the cylinder charge. The Average Energy Release Rate (AERR) is defined as the averaged burning rate of fuel mass and can be expressed in accordance with the following relationship:

$$AERR = \frac{c}{V_c^a} \varphi^b (DR)^a \exp\left(-\frac{E}{RT_{AVE}}\right) (g/sec) \quad (4)$$

where a, b, c are tuning parameters, $V_c$ is the clearance volume of the cylinder, R is the gas constant, $\varphi$ is the delivered fuel/air equivalence ratio, E is the activation energy of the bulk combustion process, DR is the delivery ratio, and $T_{AVE}$ is the average combustion temperature during combustion. The delivery ratio is defined as the mass of fresh air inducted over the mass of air that would fill displacement volume at the intake manifold pressure and temperature. It is assumed that HCCI combustion begins at the combustion TDC, where the cylinder temperature and pressure reach their maximum values before a spontaneous combustion occurs, and that the average combustion temperature ($T_{AVE}$) is approximated in accordance with the following relationship:

$$T_{AVE} = \frac{T_{TDC} + T_{EOC}}{2} \quad (5)$$

where $T_{TDC}$ and $T_{EOC}$ are temperatures at the combustion TDC and the end of combustion, respectively. $T_{TDC}$ and $T_{EOC}$ can be derived from the limited-pressure engine cycle in accordance with the following relationships:

$$T_{TDC} = T_{IVC} r^{\gamma-1}, \quad (6)$$

$$T_{EOC} = \left(\frac{\beta}{1-\gamma+\beta\gamma}\right)(r^{\gamma-1} + \delta)T_{ivc}, \quad \delta = \frac{Q_{LHV} R m_f}{C_v p_i V_{IVC}}$$

where $$\beta = \frac{V_{EOC}}{V_c}, \quad r = \frac{V_{IVC}}{V_c},$$

$V_{IVC}$ is the cylinder volume at IVC, $V_{EOC}$ is the cylinder volume at the end of combustion, $m_f$ is a given fuel mass, and $Q_{LHV}$ is the low heating value of the fuel. Since it is assumed that combustion begins at the combustion TDC, $\beta$ is proportional to combustion duration. The blow-down gas temperature at the exhaust valve opening, $T_{bd}$, can be obtained in accordance with the following relationship from the limited-pressure engine cycle:

$$T_{bd} = \beta\left(\frac{p_e}{p_i}\right)^{\frac{\gamma-1}{\gamma}} \left(\frac{1}{1-\gamma+\beta\gamma}\right)^{\frac{1}{\gamma}} (1+\delta r^{1-\gamma})^{\frac{1}{\gamma}} T_{ivc} \quad (7)$$

The exhaust gas temperature is modeled in accordance with the following relationship considering the heat transferred to the cylinder wall:

$$T_{exh} + \alpha T_{bd} + (1-\alpha)T_w \quad (8)$$

where $T_w$ is the cylinder wall temperature, $\alpha$ is a calibratable parameter as a function of operating conditions such as engine speed, charge temperature, etc.

Figure 4:
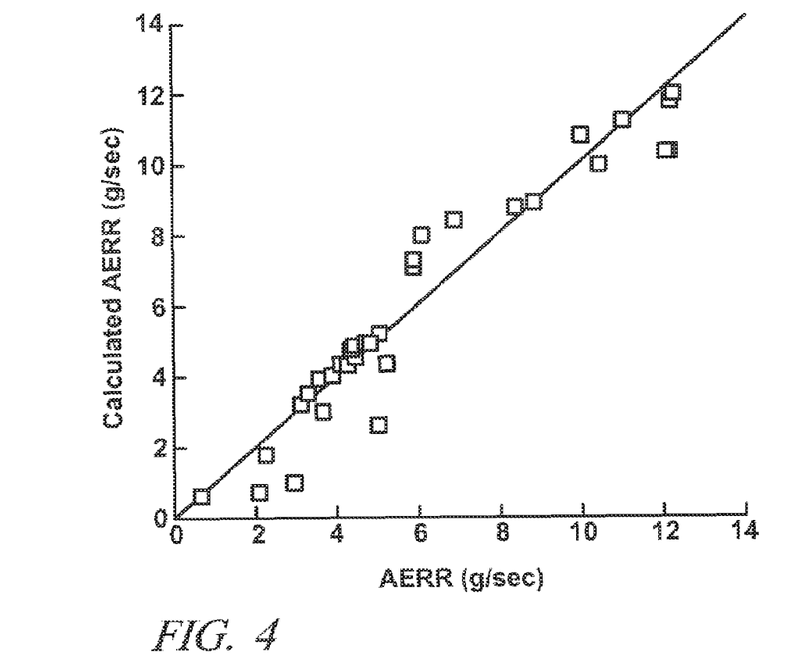
FIG. 4 is a data plot showing agreement of Average Energy Release Rate (AERR) from the model of the present invention and experimental data.

The AERR model was tuned based on experimental data collected from a single-cylinder HCCI engine. During the experiments, the engine speed and fueling rate were varied from 1000 to 2000 rpm and 7 to 18 mg/cycle, respectively, and the air-fuel ratio was varied from stoichiometry to 30:1. Given the end of combustion, AERR can be determined in accordance with the following relationship:

$$AERR = 720 \times \frac{m_f}{\theta_{EOC} \times \tau} \qquad (9)$$

where $\theta_{EOC}$ is the end of combustion in crank angle degree after the combustion TDC. FIG. 4 shows the calculated AERR from Eq. (4) and the AERR calculated using Eq. (9) based on the heat release analysis of the experimental data. FIG. 4 shows that the AERR predicted by the model matches the AERR from the experimental data within a reasonable accuracy. Once the AERR model is tuned, given an operating condition, the end of combustion can be obtained by equating Eq. (4) and Eq. (9), and by numerically solving the equation.

Figure 5:
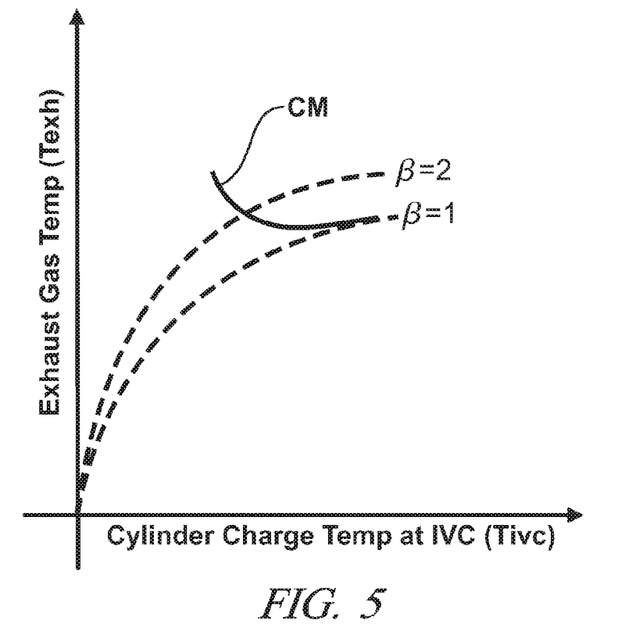
FIG. 5 is a data plot of a characteristic curve of cylinder charge temperature at intake valve closing versus exhaust gas temperature corresponding to an HCCI combustion process model in accordance with the present invention.

FIG. 5 shows typical results of the HCCI combustion process model that illustrates the relationship between the cylinder charge temperature at IVC ($T_{ivc}$) and the exhaust gas temperature ($T_{exh}$) after HCCI combustion with fixed valve profiles and hence the gas exchange process. The dashed curves illustrate the relationship between the cylinder charge temperature at IVC and the exhaust gas temperature after HCCI combustion with constant β, or equivalently, constant combustion duration. The dashed curves, therefore, are lines of constant combustion duration.

Figure 6:
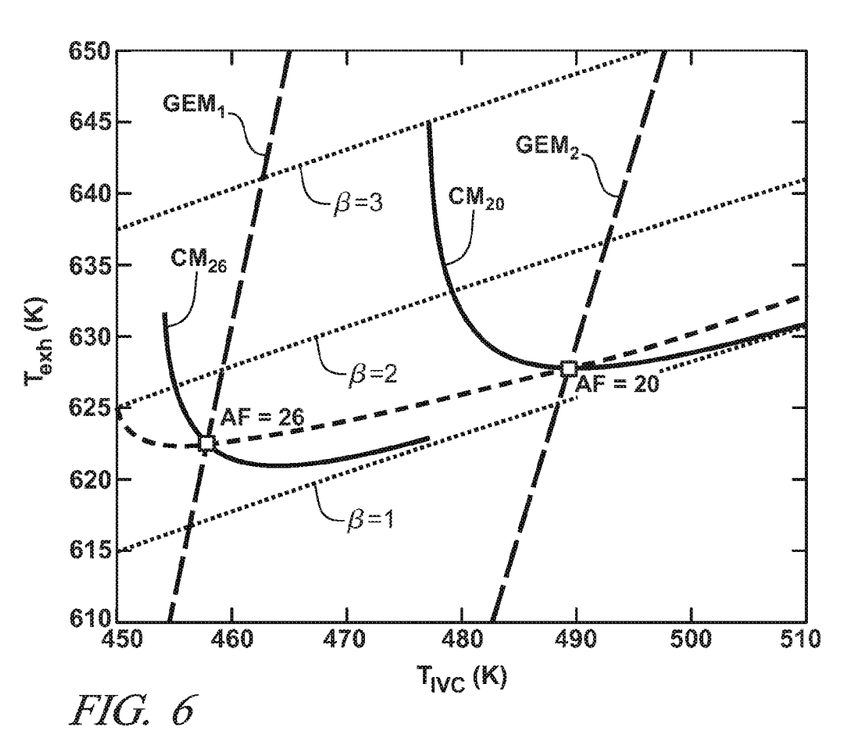
FIG. 6 is a data plot of overlaid curves of cylinder charge temperature at intake valve closing versus exhaust gas temperature corresponding to a gas exchange model and an HCCI combustion process model in accordance with the present invention for two exemplary air/fuel ratios.

Characteristics of HCCI combustion are studied by examining sensitivity of combustion phasing around those equilibrium points corresponding to the gas exchange process and combustion process models. FIG. 6 shows temperature curves GEM, CM correlating $T_{ivc}$ and $T_{exh}$ as calculated from the gas exchange process model and the combustion process model, respectively, when the fueling rate is fixed at 11 mg/cycle with no external EGR, 90 deg C. intake temperature, engine speed equal to 1000 rpm, and with air-fuel ratios equal to 20:1 and 26:1, respectively.

Thermal equilibrium points can be obtained at the junction of the two respective curves, GEM and CM, from the gas exchange process and combustion process models. Stability of the equilibrium point can be checked by building a trajectory of the exhaust gas temperature following those curves as shown in the FIG. 6. FIG. 6 shows, for example, that the resulting equilibrium point with air-fuel ratio equal to 20:1 is asymptotically stable, while that of air-fuel ratio equal to 26:1 could be either asymptotically stable or a center of stable limit cycle. It is also seen that combustion duration becomes extremely sensitive to $T_{ivc}$ as β increases, indicating that sensitivity of combustion duration over $T_{ivc}$ is closely related to how long the combustion duration is. Based on this observation, the sensitivity of auto-ignited combustion in HCCI engine can be investigated by examining sensitivity of β of those thermal equilibrium points from the model under various operating conditions.

Figure 7:
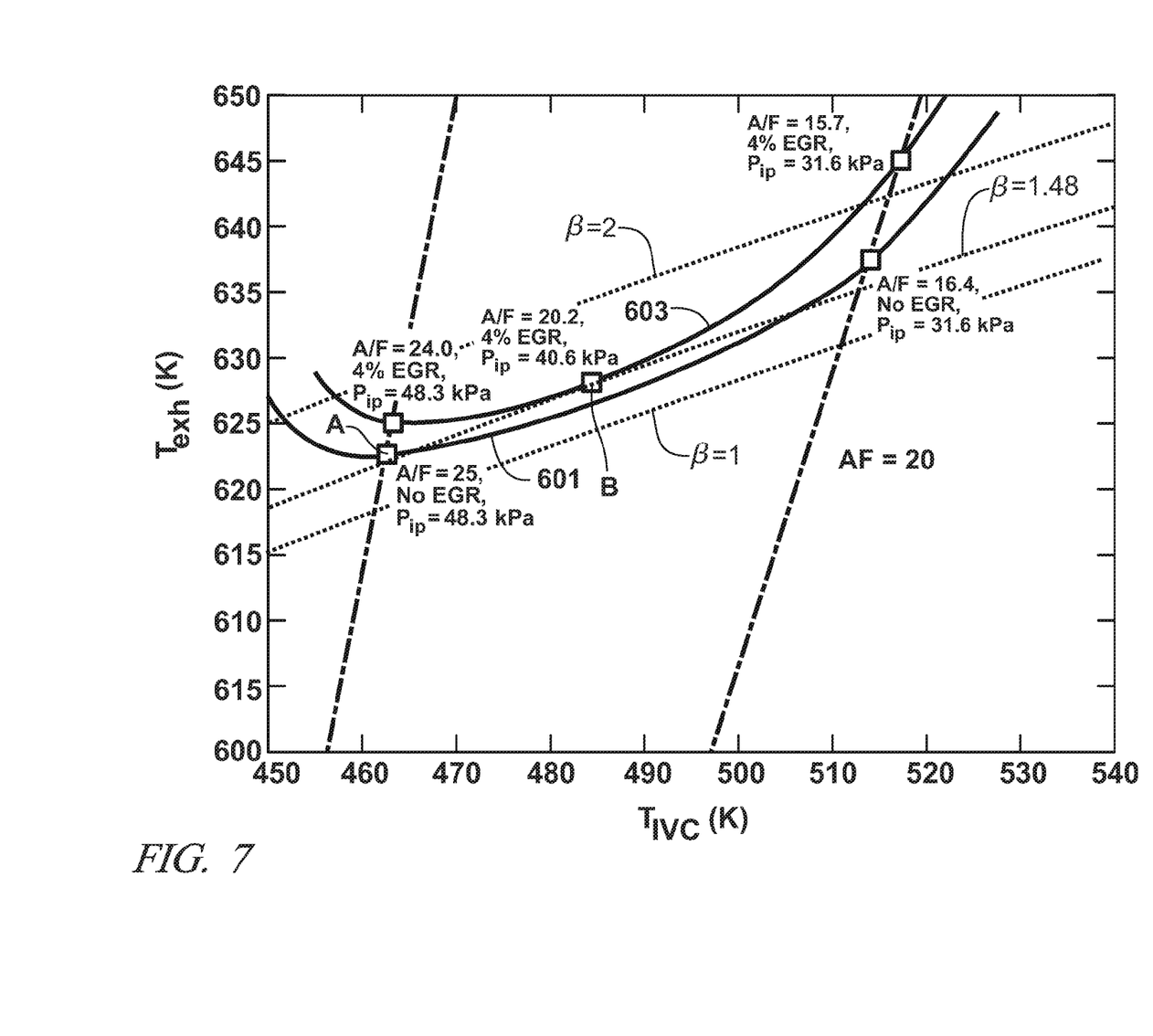
FIG. 7 is a data plot of cylinder charge temperature at intake valve closing versus exhaust gas temperature thermal equilibrium curves corresponding to a gas exchange model and an HCCI combustion process model at a predetermined fueling rate for 0% and 4% EGR derived in accordance with the present invention.

Thus, FIG. 7 shows thermal equilibrium curves obtained from the model with fueling rate equal to 11 mg/cycle at 1000 rpm, with constant intake temperature at 90 deg C., with no external EGR (curve 601) and with 4% of external EGR (curve 603). The figure also illustrates the equilibrium points when the valve profile is fixed at either one of two settings (corresponding to $GEM_1$ and $GEM_2$) so that partial pressure of intake charge remains the same at 48.3 kPa and 31.6 kPa, respectively, regardless of external EGR. FIG. 7 shows that combustion duration, and hence combustion phasing (e.g. CA50), in general increases (i.e. increasing β) with increasing external EGR. On the other hand, FIG. 7 also shows that the external EGR can reduce the combustion sensitivity over $T_{ivc}$ at certain operating conditions. For example, it is seen from FIG. 7 that combustion duration with intake partial pressure equal to 48.3 kPa with no external EGR (labeled A) and that with intake partial pressure equal to 40.6 kPa with 4% of external EGR (labeled B) are the same (i.e. β=1.48). However, the sensitivity of combustion duration over $T_{ivc}$ is significantly reduced with external EGR, and the operating condition (labeled B) should be considered as a preferred set-point for robust load transient performance for the given combustion duration β=1.48. Therefore, preferred control setpoints for a given combustion duration or phasing are those which exhibit, result in or allow minimal combustion duration or phasing variation relative to variations in cylinder charge temperature $T_{ivc}$.

To validate the model predictions, two load transient experiments were performed with a multi-cylinder HCCI engine. During the experiments, the engine was operated with exhaust recompression strategy at engine speed of 2000 rpm, and the fueling rate was changed from 7 mg/cycle to 11 mg/cycle. The engine on the experiments was operated unthrottled with HCCI combustion and included operating the engine with predetermined values of external EGR, internal EGR settings, and burned gas fraction set points for intake and exhaust gases. A closed-loop control implemented repeated adjustments to the external EGR and internal EGR settings to move the exhaust and intake gases burned gas fractions toward their set points. The desired values of combustion phasing, indicated by 50% of fuel-burn point in crank-angle (CA50), were set to be 7 deg ATDC at 7 mg/cycle of fuel and 9 deg ATDC at 11 mg/cycle of fuel, respectively. In the first experiment, desired values of air-fuel ratio were set to be 18.5 at 7 mg/cycle of fuel and 16 at 1 mg/cycle of fuel, respectively, so that the desired combustion phasing can be achieved without external EGR in steady state at either 7 mg/cycle or 1 mg/cycle of fuel. The experimental result is shown in FIG. 8.

Figure 8:
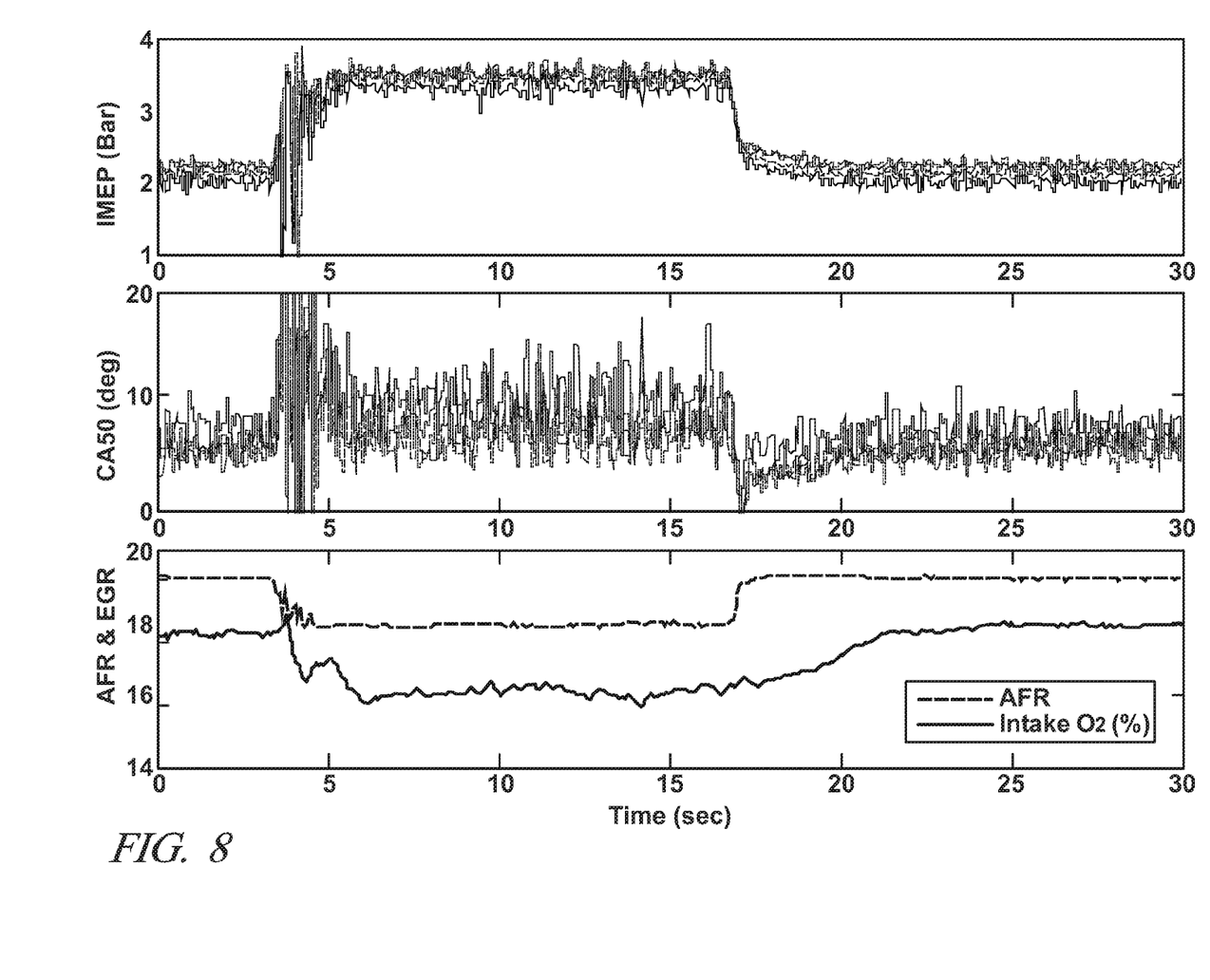
FIG. 8 illustrates various data plots corresponding to a desired combustion phasing at different steady state engine loads and transitions therebetween for engine operation without external EGR.
Figure 9:
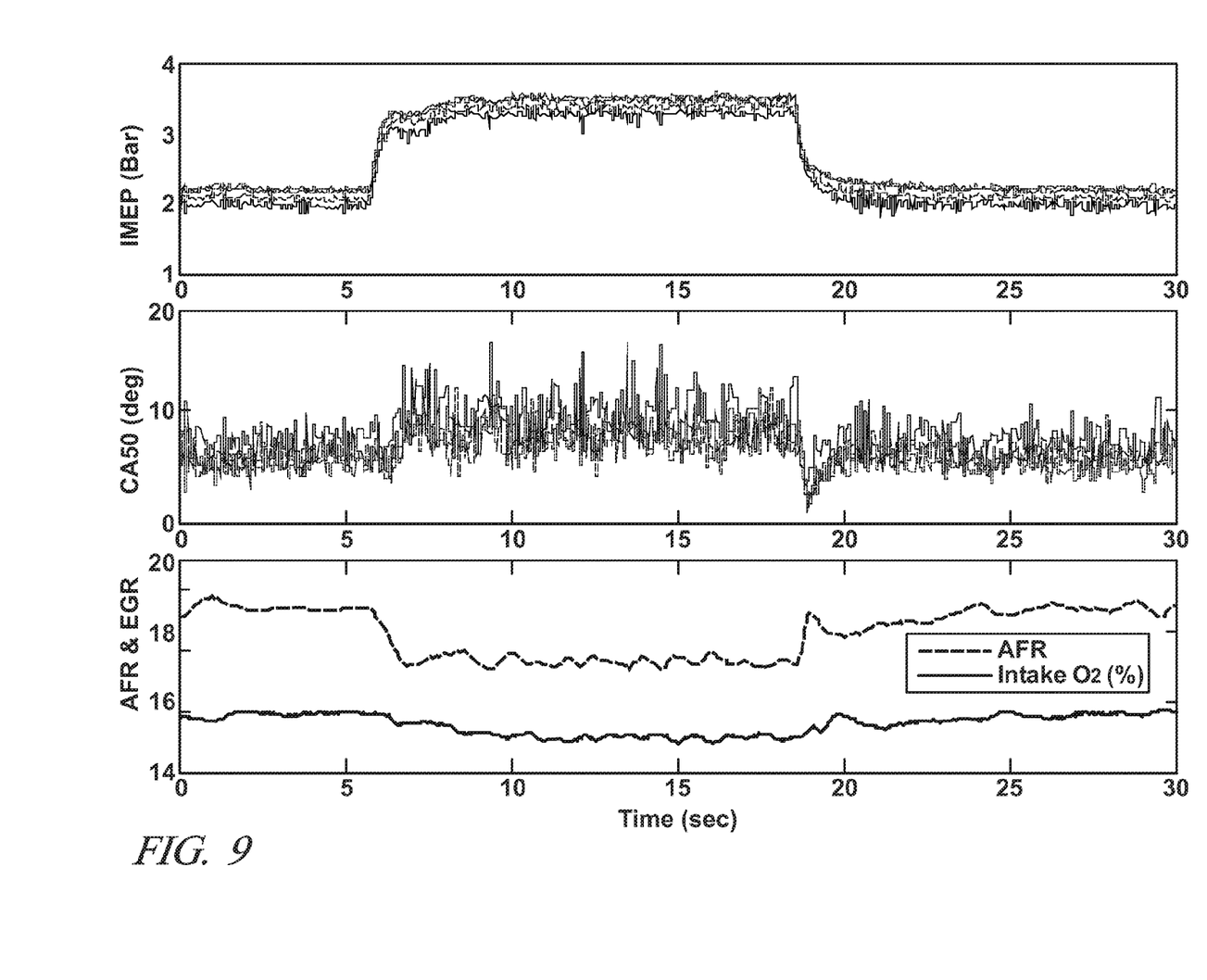
FIG. 9 illustrates various data plots corresponding to a desired combustion phasing at different steady state engine loads and transitions therebetween for engine operation with external EGR.

FIG. 8 shows that there were misfires/partial-burns during tip-in, while combustion was successfully maintained during tip-out. This indicates that combustion at chosen set-points is not robust to disturbances during transient, even though combustion is very stable in steady state. In the second experiment, desired values of air-fuel ratio were set to be 16 at 7 mg/cycle of fuel and 15 at 11 mg/cycle of fuel, respectively, so that the desired combustion phasing (7 deg ATDC and 9 deg ATDC respectively) can be achieved with external EGR in steady state at either 7 mg/cycle or 11 mg/cycle of fuel. The experimental result is shown in FIG. 9 which shows that there were no misfires/partial-burns during either tip-in or tip-out. This indicates that combustion at the chosen set-points is robust to disturbances during transient, in contrast to the first experiment.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for operating a homogeneous charge compression ignition engine, comprising:
    providing a calibration data set within a data space representing equilibrium set-points of engine operation in a plurality of engine operating parameters whereat combustion phasing is relatively least sensitive to cylinder charge temperature deviations; and
    controlling the engine operating parameters in accordance with said calibration data set.

2. Method for operating a homogeneous charge compression ignition engine as claimed in claim 1 wherein said plurality of engine operating parameters comprises at least one of engine valve profile parameters, engine fueling parameters, and engine exhaust gas recirculation parameters.

3. Method for operating a homogeneous charge compression ignition engine as claimed in claim 2 wherein said plurality of engine operating parameters further comprises at least one of engine spark parameters and intake air throttle parameters.

4. Method for operating a homogeneous charge compression ignition engine, comprising:
  providing a plurality of equilibrium data sets for combustion exhaust gas temperature and cylinder charge temperature for each of a cylinder gas exchange process and a cylinder combustion process, each data set corresponding to a respective set of predetermined engine operating conditions; and
  selecting engine operating set-points based on the equilibrium data from the plurality of equilibrium data sets that exhibit minimal sensitivity of combustion duration to deviations in cylinder charge temperature.

5. The method for operating a homogeneous charge compression ignition engine as claimed in claim 4 wherein cylinder charge temperature comprises cylinder charge temperature at intake valve closing.

6. The method for operating a homogeneous charge compression ignition engine as claimed in claim 4 comprising said cylinder gas exchange process corresponding to predetermined intake and exhaust valve profiles.

7. The method for operating a homogeneous charge compression ignition engine as claimed in claim 4 comprising said cylinder combustion process corresponding to predetermined fuel delivery.

8. Method for operating a homogeneous charge compression ignition engine, comprising:
  providing first correlated temperature data for combustion exhaust gas and cylinder charge corresponding to cylinder gas exchange;
  providing second correlated temperature data for combustion exhaust gas and cylinder charge corresponding to cylinder combustion;
  establishing equilibrium temperature data corresponding to equilibrium between said first and second temperature data;
  providing third correlated temperature data at constant combustion duration for combustion exhaust gas and cylinder charge; and
  selecting engine operating set-points based on the equilibrium temperature data and the third correlated temperature data.

9. The method for operating a homogeneous charge compression ignition engine as claimed in claim 8 wherein selecting engine operating set-points based on the equilibrium temperature data and the third correlated temperature data comprises:
  selecting engine operating set-points as a sub-set of the equilibrium data exhibiting minimal sensitivity of combustion duration to the temperature of the cylinder charge.

10. The method for operating a homogeneous charge compression ignition engine as claimed in claim 8 comprising first correlated temperature data corresponding to predetermined intake and exhaust valve profiles.

11. The method for operating a homogeneous charge compression ignition engine as claimed in claim 8 comprising second correlated temperature data corresponding to predetermined fuel delivery.

12. The method for operating a homogeneous charge compression ignition engine as claimed in claim 8 wherein temperature data for cylinder charge correspond substantially to intake valve closing.

* * * * *